US012774960B2

(12) United States Patent
Hennings et al.

(10) Patent No.: US 12,774,960 B2
(45) Date of Patent: Oct. 27, 2026

(54) SENSOR SPOT, SENSOR CAP AND SENSOR WITH IMPROVED EXCITATION LIGHT YIELD

(71) Applicant: Endress+Hauser Conducta GmbH+Co. KG, Gerlingen (DE)

(72) Inventors: Erik Hennings, Freiberg (DE); Matthäus Speck, Göpfersdorf (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 128 days.

(21) Appl. No.: 18/965,154

(22) Filed: Dec. 2, 2024

(65) Prior Publication Data

US 2025/0180481 A1 Jun. 5, 2025

(30) Foreign Application Priority Data

Dec. 1, 2023 (DE) ..................... 10 2023 133 695.9

(51) Int. Cl.
*G01N 21/64* (2006.01)

(52) U.S. Cl.
CPC . *G01N 21/6428* (2013.01); *G01N 2021/6439* (2013.01)

(58) Field of Classification Search
CPC ....... G01N 21/6428; G01N 2021/6439; G01N 21/80; G01N 2021/6434; G01N 21/643; G01N 21/6408; G01N 2021/6484; G01N 2021/775; G01N 21/77; G01N 21/645; G01N 2021/7753; G01N 2021/7786; G01N 21/63; G01N 21/6402
See application file for complete search history.

(56) References Cited

U.S. PATENT DOCUMENTS

| | | | | |
|---|---|---|---|---|
| 5,114,676 | A * | 5/1992 | Leiner | G01N 21/643 422/82.07 |
| 6,379,969 | B1 | 4/2002 | Mauze et al. | |
| 6,602,716 | B1 * | 8/2003 | Klimant | G01N 21/6428 436/805 |
| 10,251,587 | B2 | 4/2019 | Kahlman et al. | |

(Continued)

FOREIGN PATENT DOCUMENTS

| | | | |
|---|---|---|---|
| DE | 202004013614 | U1 | 11/2004 |
| DE | 102011081326 | A1 | 2/2013 |
| DE | 102014112972 | A1 | 3/2015 |

(Continued)

*Primary Examiner* — Kiho Kim
(74) *Attorney, Agent, or Firm* — Gil M. Repa; Endress+Hauser (USA) Holding, Inc.

(57) ABSTRACT

A sensor spot of an optochemical sensor for determining the concentration of an analyte in a medium, consisting essentially of a layered membrane consisting of: an analyte-permeable cover layer arranged to contact the medium during operation; a reflector layer that contains $TiO_2$; an analyte-sensitive pigment layer, wherein the sensor membrane contains at least one luminescent dye, wherein the luminescence of the analyte-sensitive layer depends upon the concentration of the analyte; an aerogel layer, wherein the aerogel layer consists of a silicate aerogel; a glass substrate, wherein the glass substrate preferably consists of quartz glass. The present disclosure further relates a sensor cap containing the sensor spot and a sensor containing the sensor cap.

17 Claims, 4 Drawing Sheets

(56) References Cited

U.S. PATENT DOCUMENTS

| | | | | |
|---|---|---|---|---|
| 2003/0003593 | A1* | 1/2003 | Wallach ................. | G01N 21/76<br>427/2.13 |

FOREIGN PATENT DOCUMENTS

| | | | |
|---|---|---|---|
| DE | 102015118133 | A1 | 4/2016 |
| DE | 102017114535 | A1 | 1/2019 |
| DE | 102017128564 | A1 | 6/2019 |
| DE | 102018116345 | A1 | 1/2020 |
| DE | 102019116397 | A1 | 12/2020 |
| DE | 102023101839 | A1 | 6/2024 |
| WO | 02056023 | A1 | 7/2002 |

* cited by examiner 10
1
11
13
12
21
15
L
L
α

SENSOR SPOT, SENSOR CAP AND SENSOR WITH IMPROVED EXCITATION LIGHT YIELD

CROSS-REFERENCE TO RELATED APPLICATIONS

The present application is related to and claims the priority benefit of German Patent Application No. 10 2023 133 695.9, filed on Dec. 1, 2023, the entire contents of which are incorporated herein by reference.

TECHNICAL FIELD

The present disclosure relates to a sensor spot, a sensor cap containing the sensor spot, and a sensor containing the sensor cap, wherein the sensor spot, the sensor cap, and the sensor have an improved excitation of the analyte-sensitive luminescence layer due to improved material properties of the sensor spot.

BACKGROUND

Optical sensors are sensors that are based upon an opto-chemical reaction with the medium.

The measuring principle of an optochemical sensor is based upon sending excitation light from a light source, e.g., an LED, of the sensor to a sensor spot contained in the sensor head, wherein the sensor spot is in contact with the medium to be examined containing the analyte to be measured with its surface facing the medium during operation. The sensor spot contains at least one luminescent dye, which is arranged in an analyte-sensitive pigment layer, wherein the luminescent dye reflects the luminescent radiation back to a detector unit of the sensor, which converts the measured radiation into an electrical signal and forwards it to the sensor electronics.

Depending upon the properties of the luminescent dye, the optical sensor reacts to different analyte concentrations with different light intensities, frequencies, or light decay curves.

Corresponding sensors are produced and marketed by the applicant in the most varied embodiments.

The sensor unit of a sensor contains a sensor membrane or a sensor spot comprising a substrate, e.g., a glass plate or an optical fiber, onto which the polymer/dye mixture tailored for a given analyte is applied as a solid film.

Typically, such sensor spots or sensor membranes are made up of a plurality of layers. An analyte-sensitive pigment layer containing a luminescent dye is applied to a glass substrate, e.g., made of quartz glass, which is incorporated into a matrix made, for example, of silicone. A covering layer, e.g., made of silicone, is applied to this analyte-sensitive pigment layer. Between the analyte-sensitive pigment layer and the cover layer, a reflector layer, which, for example, contains $TiO_2$, can be arranged, which reflector layer is designed to prevent stray light losses. The reflector layer comprising silicone and containing $TiO_2$ has a significantly different refractive index from the quartz glass and the silicone. For example, quartz glass and silicone have a refractive index n of 1.25-1.8, while $TiO_2$ has a refractive index n of more than 2-4.

The disadvantage of the sensor membranes according to the prior art is a low light yield on the analyte-sensitive pigment layer due to scattering of the incident light on the membrane. This results in a lower yield of the light incident on the analyte-sensitive pigment layer as well as a low yield of the fluorescence radiation.

SUMMARY

The object of the present disclosure is to provide a sensor element or a sensor membrane of an optochemical sensor which overcomes the disadvantages of the prior art by increasing the yield of light which impinges on the analyte-sensitive pigment layer in order to excite the luminescent dyes integrated into the analyte-sensitive pigment layer.

The object is achieved by providing a sensor spot according to the present disclosure, a sensor cap containing the sensor spot according to the present disclosure, and a sensor containing the sensor cap according to the present disclosure.

The present disclosure relates to a sensor spot of an optochemical sensor for determining the concentration of an analyte in a medium, consisting of (i) a membrane which is composed of a plurality of layers, consisting essentially of (ii) an analyte-permeable cover layer which contacts the medium during operation and which may consist of silicone, (ii) a reflector layer which is arranged on the side, facing away from the medium, of the cover layer and contains $TiO_2$, wherein the $TiO_2$ layer may be applied in a completely covering manner, (iii) an analyte-sensitive pigment layer arranged on the side, facing away from the medium, of the reflector layer, wherein the sensor membrane contains at least one luminescent dye, wherein the luminescence of the analyte-sensitive layer depends upon the concentration of the analyte, and (iv) an aerogel layer arranged on the side, facing away from the medium, of the analyte-sensitive layer, wherein the aerogel layer consists of a silicate aerogel, and (v) a glass substrate arranged on the side, facing away from the medium, of the aerogel layer, wherein the glass substrate preferably consists of quartz glass.

In at least one embodiment, the optochemical sensor spot comprises a silicate aerogel, wherein the silicate acts like a semi-transparent mirror due to its structure. This allows the light to be oriented in a manner directed onto the pigment layer. Silicate aerogels are materials with unusual properties such as a high specific surface area (500-1,200 $m^2/g$), a high porosity (80-99.8%), a low density (approx. 0.003 $g/cm^3$), a high thermal insulation value (0.005 W/m K), an extremely low dielectric constant (k=1.0-2.0), and a low refractive index (approx. 1.00 to 1.24).

In at least one embodiment, the layers of the sensor membrane are adhesively and/or covalently bonded to one another.

In at least one embodiment, the analyte-sensitive luminescent dye is an analyte-sensitive fluorescent or phosphorescent dye, wherein the analyte is a gas dissolved in the medium, selected from $O_2$, $CO_2$, $O_3$, nitrogen oxides, $NH_3$, preferably $O_2$;

a cation dissolved in the medium, selected from hydronium, Na+; K+, $NH^{4+}$, $Ca^{2+}$, and $Mg^{2+}$;

an anion dissolved in the medium, selected from chloride ions and nitrate ions, or an organic molecule selected from glucose, lactose, and lactate.

The present disclosure also relates to a sensor cap for an optochemical sensor for determining and/or monitoring at least one analyte in a medium, containing a cylindrical inner component containing a sensor spot according to the present disclosure and a sleeve-shaped outer component which borders the inner component, wherein the inner component and the outer component are detachably mechanically connected to one another, for example, via a screw connection.

The present disclosure also relates to an optical sensor for determining or monitoring at least one analyte in a medium, having a sensor cap according to the present disclosure, and an electronics component, which are detachably connected to one another, wherein the electronics component consists of a first module having a light source and a detector, and of a second module having a transceiver.

In at least one embodiment of the optical sensor, the sensor cap is detachably connected to the electronics component mechanically, for example, via a screw connection.

In at least one embodiment of the optical sensor, the first and the second modules are connected to one another via a detachable plug connection unit, wherein the plug connection unit is designed to transmit energy and/or data by means of a galvanically isolated, for example, inductive, interface, wherein the detachable plug connection unit is preferably a bayonet closure, wherein energy is transmitted unidirectionally from the second module to the first module, and data, in particular data on the analyte concentration, are transmitted bidirectionally between the first and the second modules.

The present disclosure also relates to an optical analysis system comprising the sensor according to the present disclosure or an embodiment thereof, wherein the second module of the optical sensor is electrically connected to a data processing unit via a connection.

Aerogels are highly porous solids in which up to 99.98% of the volume consists of pores. The aerogels used in the sensor are silicate aerogels which have a refractive index n of 1.00-1.24, for example, 1.002 to 1.24.

The sensor spot is also called a sensor membrane or sensor element.

The sensor spot according to the present disclosure improves the proportion of light incident on the analyte-sensitive pigment layer or luminescent dye layer by repeatedly reflecting the applied radiation between the aerogel layer, which is a semi-transparent mirror, and the reflector layer. Due to the increased proportion of usable light with the same applied power, the yield of the incident light in the sensor spot increases, and thus also the yield of fluorescent light that is transmitted to the detector. This improves the performance of the sensor with the same energy input. The improved performance allows the amount of expensive luminescent dye used to be reduced and/or the optical sensor to be operated at lower power.

In one embodiment of the optochemical sensor, the light source and the detector unit are arranged directly on the region, facing away from the medium during operation of the sensor, of the optical component. The measuring radiation or light is radiated from the light source onto the sensor spot or sensor membrane, or the detector unit receives the light from the optical component, wherein there is air between the light source, the detector unit, and the sensor spot.

In at least one embodiment of the optochemical sensor, at least one optical waveguide is provided, by means of which the light is guided from the light source to the region, facing away from the medium during operation of the sensor, of the optical component, and from the region, facing away from the medium, of the optical component to the detector unit.

In at least one embodiment, the optical sensor is designed as a hygienic sensor and is used in the field of bioprocess engineering and/or pharmaceutical process engineering.

The luminescent material of the analyte-sensitive pigment layer containing at least one luminophore is simultaneously analyte-sensitive, so that the light emitted by the luminescent material is influenced by the analyte content of the medium, and thus the biological, chemical, or physical measured quantity can be determined. In this case, biological, chemical, or physical measured quantities include, for example, the concentration of an analyte in a medium, e.g., gases dissolved in an aqueous medium, such as the oxygen concentration, carbon dioxide concentration, nitrogen oxides and/or ozone, the concentration of organic molecules such as glucose concentration, lactose concentration, lactate concentration, the concentration of ions, e.g., by measuring the hydronium or hydrogen ions and thus the pH, a concentration of nitrate ions, chloride ions, ammonium ions, sodium ions or potassium ions, calcium ions or magnesium ions, the concentration of a solvent such as water, or the concentration of biological molecules—for example, luminescent biological molecules such as antibodies.

In luminescence, a physical system is put into an excited state by externally supplied energy and emits photons when it transitions into its ground state. The term luminescence refers either to the process (phenomenon) or to the radiation emitted. Fluorescence is defined as the spontaneous emission of radiation during the transition from an electronically excited state to a ground state; if an excited intermediate state can "freeze" the energy for a certain time, then this is called phosphorescence.

The luminescent dye interacts selectively with the analyte to be measured in the medium in such a way that an optical property of the luminescent dye changes depending upon the concentration of an analyte in the medium in contact with the sensor element.

In at least one embodiment, the luminescence intensity, preferably fluorescence intensity, depends upon the concentration of the analyte. For an ion-sensitive, e.g., pH-sensitive, dye, the luminescence, e.g., fluorescence, intensity depends upon the concentration of the ions, e.g., hydrogen ion or hydronium ion concentration, in the medium.

In at least one embodiment, the concentration of an analyte, for example a hydrogen ion or a hydronium ion, and thus, for example, the pH, is determined by dual lifetime referencing.

The measurement by dual lifetime referencing involves the measurement of the luminescence of two different luminescent dyes, wherein a first luminescent dye responds to the analyte in luminescence intensity, and a second luminescent dye does not respond to the analyte, at least in terms of luminescence intensity and decay time, wherein the first and the second luminescent dye have different decay times, wherein the decay time of the second luminescent dye is longer than that of the first luminescent dye, wherein the time or phase behavior of the additively superimposed luminescence responses of both phosphors are measured by a single detector, and that a reference quantity independent of the total intensity of both phosphors is obtained from the measured time or phase behavior, and that the concentration of an analyte is determined using the reference quantity.

The first and second luminescent dyes can be arranged in the same layer or in different layers.

In at least one embodiment, if the analyte is present, a fluorescence of the fluorophore triggered by a stimulation radiation may be reduced (principle of fluorescence quenching). In an oxygen sensor, the fluorophorescent dye is excited with radiation. There is an energy transfer from the excited fluorophorescent dye (in triplet state) to the ground state (triplet state) of the oxygen: the decrease in fluorescence intensity depends upon the concentration of dissolved oxygen.

The analyte-sensitive indicator dye is a luminescent dye from the series of porphyrins, BODIPY, metal porphyrins, benzoporphyrins, azabenzoporphyrins, naphthoporphyrins, phthalocyanines, polycyclic aromatic hydrocarbons, in particular perylenes, perylenediimines, pyrenes; xanthene dyes, azo dyes, bodipy dyes, azabodipy dyes, cyanine dyes, metal-ligand complex dyes, in particular bipyridines, bipyridyls, phenantrolines, coumarins and acetylacetonates of ruthenium and iridium; acridine dyes, oxazine dyes, coumarins, azaannulenes, squarines, 8-hydroxyquinolines, polymethines, luminescent nanoparticles, such as quantum dots, nanocrystals, which are optionally covalently bound to the polymer matrix.

Methods known in the prior art for producing membrane layers of a sensor spot or sensor membrane include, for example, application by doctor blade coating, electrospinning, spraying, spray coating, or dip coating.

All the modular systems and the measuring systems described above can be combined with each other in each case, provided that this is technically possible.

BRIEF DESCRIPTION OF THE DRAWINGS

The present disclosure is explained in more detail in the following description with reference to the exemplary embodiments shown in the drawing.

In the figures.

DETAILED DESCRIPTION

Figure 1A:
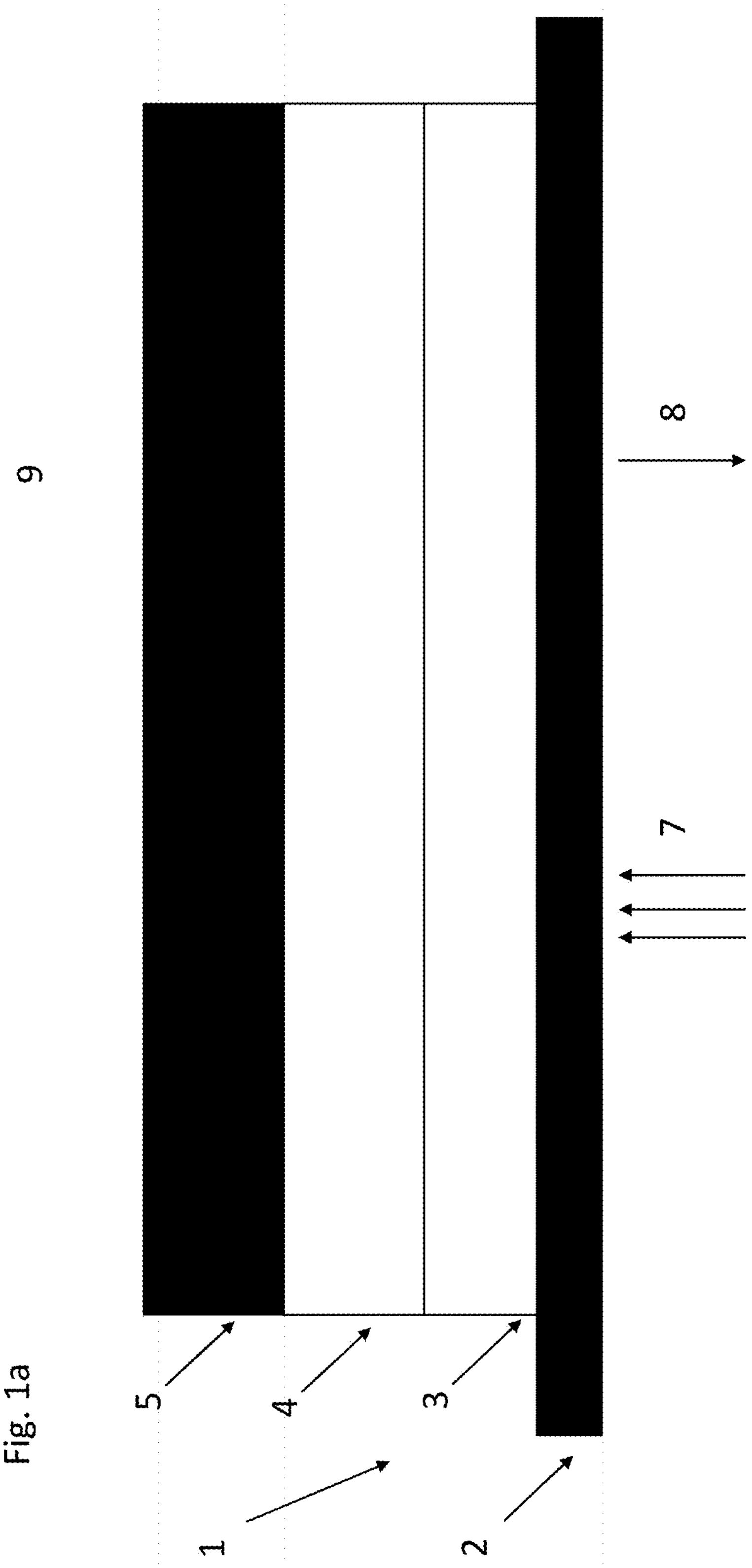
FIGS. 1*a* and 1*b* show a sensor spot according to the prior art (1*a*) and a sensor spot according to the present disclosure (1*b*).
Figure 1B:
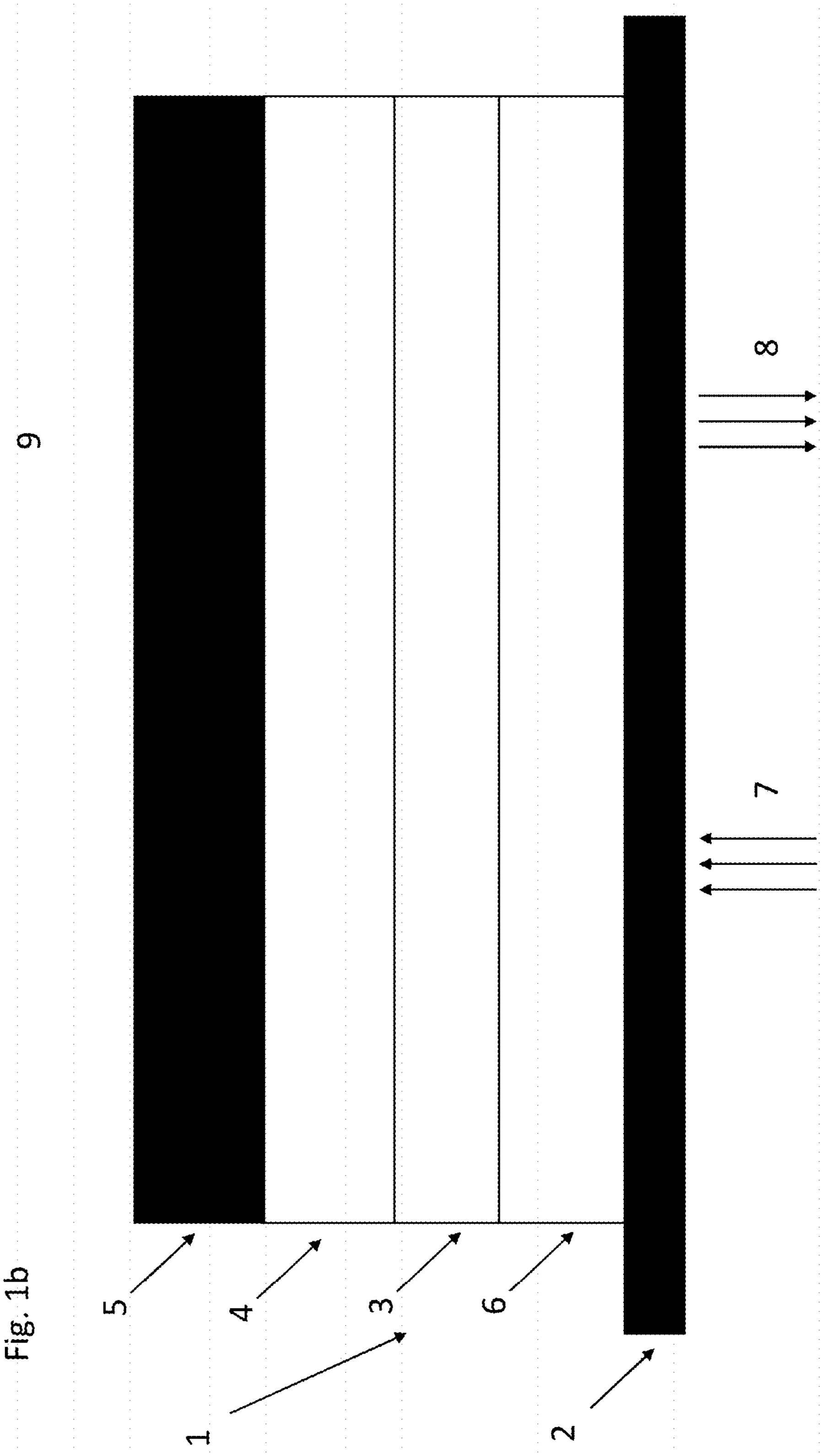

FIG. 1*a* shows a sensor spot as known from the prior art. FIG. 1*b* shows the sensor spot according to the present disclosure.

In the sensor spot (1) according to FIG. 1*a*, the sensor layers are applied one above the other on a glass carrier (2), wherein the glass carrier (2), which preferably consists of quartz glass, is arranged on the side facing away from the medium during operation of the sensor. The analyte-sensitive pigment layer (3) containing the luminescent dye is arranged on the medium side of the glass carrier (2). A $TiO_2$ reflector layer (4) is arranged on the medium side of the analyte-sensitive pigment layer (3). A cover layer (5) is arranged on the medium side of the $TiO_2$ reflector layer (4), which cover layer is permeable to the analyte to be measured, but is impermeable to the medium (9) in which the analyte is dissolved, for example, water. Compared to the incident light (7), usable light is lost due to scattering effects, resulting in less usable radiation hitting the analyte-sensitive pigment layer (3). Consequently, the proportion of radiation (8) emitted by the pigment layer (3) is also reduced.

The sensor spot (1) according to FIG. 1*b* has a structure in which an aerogel layer (6) is arranged between the analyte-sensitive pigment layer (3) and the glass carrier (2). This ensures improved light incidence and consequently improved transmission of the fluorescence radiation (8), in which the incident light (7) is reflected between the aerogel layer and the reflector layer, and the light is thus used optimally.

Figures 2A, 2B:
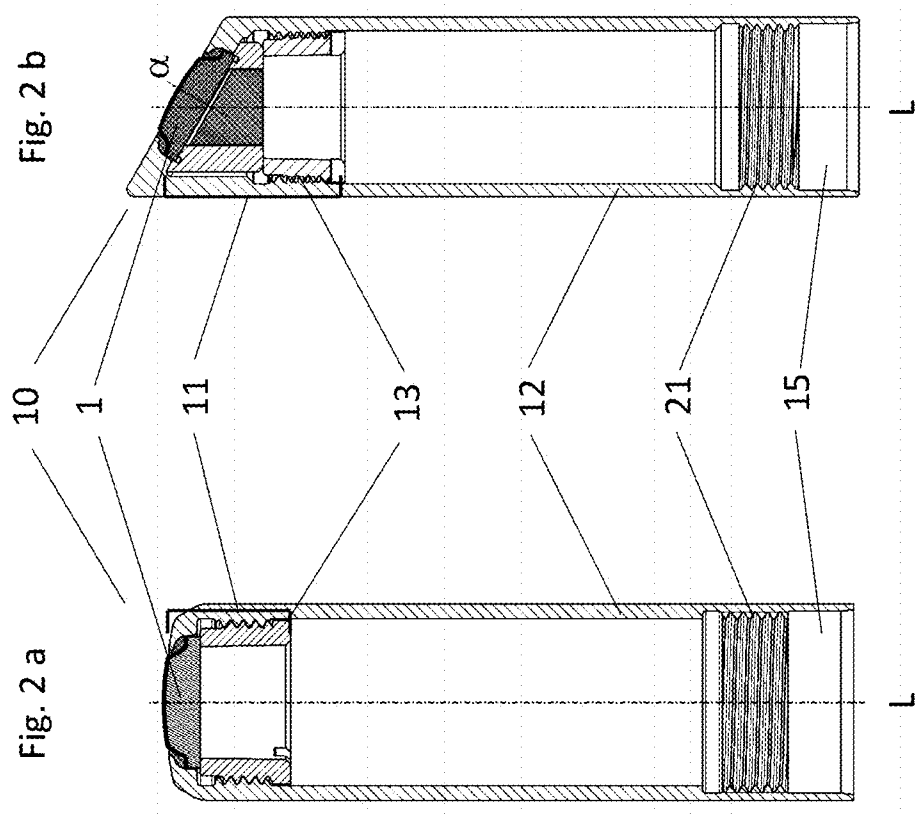
FIGS. 2*a* and 2*b* show a sensor cap in (2*a*) a horizontal arrangement of the sensor element to the longitudinal axis of the sensor and (2*b*) an arrangement of the sensor cap angled to the longitudinal axis of the sensor, wherein the angle a is between 20° and 40°.

The sensor caps (10) from FIG. 2*a* and FIG. 2*b* comprise the sensor spot (1) according to the present disclosure from FIG. 1*b*. The sensor cap consists of an inner component (11), which encloses the sensor spot, and a shell-like, outer component (12). The inner component (11) and the outer component (12) are connected to each other via a detachable mechanical connection, wherein the mechanical connection preferably is a screw connection.

The sensor caps (10) are also connected to the electronics component (15) of the optical sensor via a detachable mechanical connection (21), for example, via a screw connection.

Figure 3:
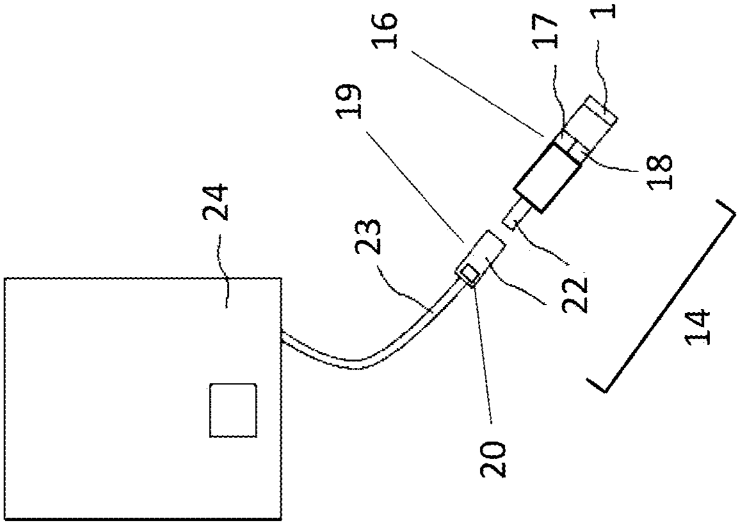
FIG. 3 shows an optical sensor with an inductive interface.

The sensor (14) according to FIG. 3 comprises the sensor cap (10) and the electronics component (14), wherein the electronics module consists of a first module (16) comprising the light source (17) and the detector (18), and a second module (19) containing the transceiver (20). The first (16) and the second module (19) are connected to one another via a mechanical plug connection unit (22), wherein the mechanical plug connection unit (22) comprises an inductive interface. The mechanical plug connection unit (22) may be a bayonet closure.

Reference signs are not to be understood as a limitation of the scope of the subject matter protected by the claims. They serve only the purpose of making the claims easier to understand.

We claim:

1. A sensor spot of an optochemical sensor for determining a concentration of at least one analyte in a medium, the sensor spot comprising:

a membrane composed of a plurality of layers, consisting essentially of:

an analyte-permeable cover layer arranged to contact the medium during operation;

a reflector layer, which contains $TiO_2$, arranged on a side of the cover layer facing away from the medium;

an analyte-sensitive pigment layer arranged on a side of the reflector layer facing away from the medium, wherein the membrane contains at least one analyte-sensitive luminescent dye, wherein a luminescence of the analyte-sensitive pigment layer depends upon a concentration of the at least one analyte;

an aerogel layer arranged on a side of the analyte-sensitive pigment layer facing away from the medium, wherein the aerogel layer consists of a silicate aerogel; and a glass substrate arranged on a side of the aerogel layer facing away from the medium.

2. The optochemical sensor spot according to claim 1, wherein the silicate aerogel has a refractive index of 1.00 to 1.24.

3. The optochemical sensor spot according to claim 1, wherein the layers of the membrane are adhesively and/or covalently bonded to one another.

4. The optochemical sensor spot according to claim 1, wherein the at least one analyte-sensitive luminescent dye is an analyte-sensitive fluorescent dye or phosphorescent dye, wherein the at least one analyte is a gas dissolved in the medium selected from $O_2$, $CO_2$, $O_3$, nitrogen oxides, and $NH_3$.

5. A sensor cap for an optochemical sensor for determining and/or monitoring least one analyte in a medium, the sensor cap comprising:

a cylindrical inner component containing a sensor spot according claim 1; and a sleeve-shaped outer component structured to border the inner component, wherein the inner component and the outer component are detachably mechanically connected to one another.

6. An optical sensor for determining or monitoring at least one analyte dissolved in a medium that includes a sensor cap according to claim 5 and an electronics component, wherein the electronics component and the sensor cap are detachably connected to each other, wherein the electronics component includes a first module and a second module, wherein the first module includes a light source and a detector, and the second module includes a transceiver.

7. The optical sensor according to claim 6, wherein the sensor cap is detachably connected to the electronics component mechanically.

8. The optical sensor according to claim 6, wherein the first module and the second module are connected to each other via a detachable plug connection unit, wherein, the plug connection unit is configured to transmit energy and/or data through a galvanically isolated interface, wherein energy is transmitted unidirectionally from the second module to the first module, and data are transmitted bidirectionally between the first module and the second module.

9. The optical sensor according to claim 8, wherein the galvanically isolated interface is inductive and the detachable plug connection unit is a bayonet closure.

10. The optical analysis system including the sensor according to claim 6, wherein the second module of the optical sensor is electrically connected to a data processing unit via a connection.

11. The optical sensor according to claim 6, wherein the sensor cap is connected to the electronics component via a screw connection.

12. The sensor cap for an optochemical sensor according to claim 5, wherein the inner component and the outer component are detachably connected via a screw connection.

13. The optochemical sensor spot according to claim 1, wherein the at least one analyte-sensitive luminescent dye is an analyte-sensitive fluorescent dye or phosphorescent dye, wherein the at least one analyte is a cation dissolved in the medium selected from hydronium, $Na^+$, $K^+$, $NH_4^+$, $Ca^{2+}$, and $Mg^{2+}$.

14. The optochemical sensor spot according to claim 1, wherein the at least one analyte-sensitive luminescent dye is an analyte-sensitive fluorescent dye or phosphorescent dye, wherein the at least one analyte is an anion dissolved in the medium selected from chloride ions and nitrate ions.

15. The optochemical sensor spot according to claim 1, wherein the at least one analyte-sensitive luminescent dye is an analyte-sensitive fluorescent dye or phosphorescent dye, wherein the at least one analyte is an organic molecule dissolved in the medium selected from glucose, lactose, and lactate.

16. The optochemical sensor spot according to claim 1, wherein the silicate aerogel has a refractive index of 1.002 to 1.24.

17. The sensor spot according to claim 1, wherein the glass substrate consists of quartz glass.

* * * * *